United States Patent [19]
Girotti et al.

[11] 3,985,821
[45] Oct. 12, 1976

[54] ADDITIVE FOR IMPROVING THE VISCOSITY INDEX OF LUBRICATING OILS AND LUBRICANTS SO OBTAINED

[75] Inventors: Pier Leone Girotti; Renato Tesei; Telemaco Floris, all of San Donato Milanese, Italy

[73] Assignee: Snam Progetti S.p.A., Milano, Italy

[22] Filed: Mar. 12, 1974

[21] Appl. No.: 450,317

[30] Foreign Application Priority Data
Mar. 12, 1973 Italy .................. 21460/73

[52] U.S. Cl. .......................... 260/683.9; 252/59; 260/676 R
[51] Int. Cl.² ................................. C07C 5/02
[58] Field of Search ......... 252/59; 260/96 D, 683 R, 260/683.9, 683.15 D, 677 H, 676 R, 683.15 B

[56] References Cited
UNITED STATES PATENTS

| | | | |
|---|---|---|---|
| 3,149,178 | 9/1964 | Hamilton et al. | 252/59 X |
| 3,637,503 | 1/1972 | Giannetti et al. | 252/59 |
| 3,737,477 | 6/1973 | Stearns et al. | 260/683 R X |
| 3,763,244 | 10/1973 | Shubkin | 260/676 R |
| 3,795,616 | 3/1974 | Heilman et al. | 252/59 |
| 3,798,284 | 3/1974 | Tesei et al. | 260/683.15 D |
| 3,836,596 | 9/1974 | Driscoll | 252/59 X |
| 3,842,134 | 10/1974 | Pratt | 252/59 X |
| 3,845,157 | 10/1974 | Woo | 260/683 R X |
| 3,851,011 | 11/1974 | Stearns et al. | 260/683 R X |

OTHER PUBLICATIONS
Georgi "Motor Oils & Engine Lubrication" (1950) pp. 204–205.

Primary Examiner—Delbert E. Gantz
Assistant Examiner—Andrew H. Metz
Attorney, Agent, or Firm—Ralph M. Watson

[57] ABSTRACT

An additive, adapted to improve the viscosity index of a mineral or synthetic lubricating oil, is prepared from polymeric material of very high viscosity boiling above 175°C, and obtained through polymerization of normal alpha-olefines having the general formula R—CH=CH$_2$, wherein R is an alkyl radical containing from 2 to 16 carbon atoms, in the presence of a TiCl$_4$./polyiminoalane catalyst, in a substantially inert atmosphere which may contain hydrogen up to a manometer pressure of 1 kg/cm², by distilling said polymeric material so that the fraction boiling at a temperature below 350°C at atmospheric pressure is removed therefrom, and catalytically hydrogenating the balance thereof to produce the desired end product.

3 Claims, No Drawings

ADDITIVE FOR IMPROVING THE VISCOSITY INDEX OF LUBRICATING OILS AND LUBRICANTS SO OBTAINED

The present invention relates to the preparation of an additive adapted to improve the viscosity index of mineral and synthetic lubricating oils.

The means currently employed for improving the viscosity index of lubricants consists in the addition of some products named "Viscosity Index Improvers" (V.I.I.) which are for the most part polymers such as polyisobutylenes, polymetacrylates, polyacrylates, and copolymers of styrene and of aliphatic olefines. Said products are however, subject to the disadvantage that they are subject to a considerable depolymerization during the running of an engine with a consequent decrease in the viscosity and the viscosity index of the oils containing them.

We have found new polymers that can be used as "Viscosity Index Improvers" whose rate of depolymerization is lower than that of the commercial polymers now in use.

The process for the preparation of the Viscosity Index Improver of the present invention is carried out in two successive phases.

The first phase is described in a copending patent application Ser. No. 450,474 filed by us on Mar. 12, 1974, which concerns the preparation of a polymer having a very high molecular weight and which is therefore very viscous.

Such polymer, with an initial boiling point of 175° C, is obtained at high yield through the polymerization of mixtures of normal alpha-olefines from wax cracking or of single normal alpha-olefines having the following general formula $R-CH = CH_2$ wherein R is an alkyl radical containing from 2 to 16 carbon atoms, in the presence of a catalyst formed by the complex $TiCl_4$/PIA (Titanium tetrachloride/polyiminoalane) by operating in an inert atmosphere or at least partially substituted with hydrogen at a manometer pressure of hydrogen not higher than 1 kg/cm² and afterwards distilling the product of the polymerization up to a head temperature of 175° C.

The second phase of the process, whereby the additive in object is obtained, consists in subjecting said polymer having an initial boiling point of 175° C to a reduced pressure distillation up to a temperature which corresponds to a distillation temperature of 350° C at atmospheric pressure, hereinafter referred to as the "head temperature". The product so obtained, with an initial boiling point of 350° C (350° C +) is catalytically hydrogenated after having been diluted with a light solvent (n-heptane) and thereafter the solvent is stripped therefrom.

The catalyst used for said hydrogenation may be one of those normally employed in the relevant art and in this particular case use is made of a catalyst based on Ni carried on Kieselguhr.

The hydrogenation temperature is 180° C, hydrogen pressure 100 kg/cm², contact time 2 hours.

The Viscosity Index Improver additive of our invention is characterized by its ability to present in the lubricating mixtures containing it a low depolymerization degree. This is holds true whether it is mixed with a mineral base oil obtained from the refining of high boiling petrol products or with a synthetic light fraction.

With the Viscosity Index Improver additive of the present invention multigrade lubricating oils can be obtained having good characteristics.

The multigrade lubricants, as is well known, are oils which possess a low viscosity when they are cold and a high viscosity when they are hot and their use besides presenting advantages in the operation of an engine (for instance for starting with a cold engine), makes it possible to avoid the season change drawbacks.

In table 1 are reported the viscosity limits of such multigrade oils at 0° F and at 210° F, according to SAE classification.

TABLE 1

| SAE CLASSIFICATION FOR ENGINE OILS | | | | |
|---|---|---|---|---|
| | Values of the viscosity | | | |
| | at 0° F, centipoises (cP) | | at 210° F, centistokes (cSt) | |
| | minimum | maximum | minimum | maximum |
| SAE 5 W | | less than 1200 | | |
| SAE 10 W | 1200 | 1400 | | |
| SAE 20 W | 2400 | 9600 | | |
| SAE 30 | | | 9.6 | 12.9 |
| SAE 40 | | | 12.9 | 16.8 |
| SAE 50 | | | 16.8 | 22.7 |

From said table it will be seen that the 20 W - 50 multigrade oils must present a viscosity at 0° F (17.8° C) between 2400 and 9600 cP and a viscosity at 210° F between 16.8 and 22.7 cSt. For the 10 W - 40 multigrades the limits are on the contrary: viscosity at 0° F between 1200 and 2400 cP and a viscosity at 210° F between 12.9 and 16.8 cSt. The 10 W - 50 multigrade oils have to present on the contrary a viscosity at 0° F between 1200 and 2400 cP and a viscosity at 210° F between 16.8 and 22.7 cSt. The multigrade oils 5 W - 30, to be used in the very cold climates have as limits a viscosity at 0° F still lower, namely lower than 1200 cP and at viscosity a 210° F between 9.6 and 12.9 cSt.

Illustrative, not limitative, examples of the preparation of polymers used as viscosity index improvers are reported below starting with polymers with different viscosities.

In the examples, multigrade lubricating mixtures will be described which are obtained through the addition of said viscosity index improvers polymers in mineral or synthetic base oils. There will be reported also some comparison examples between the characteristics of the invention oils and the characteristics of commercial oils.

The exemplified lubricating mixtures are constituted, besides that by the hydrogenated polymer with initial boiling point of 350° C, by the mineral or synthetic base oil, by the additive for lowering the pour point and by the package of addition containing detergent, antioxidant and antiwear additives.

As detergent additives we mean sulphonated or phenated compounds, based on Ca, Ba, Mg and so on; as dispersant additives we mean compounds of the ashless type derived from the alkenyl succinimides and so on. As antioxidant and antiwear additives we mean phenols, dithiophosphates of Zn, and so on.

EXAMPLE 1

A polymer with initial boiling point of 175° C, having a viscosity at 210° F of 660 cSt, prepared as above reported, was subjected to a distillation at a reduced pressure up to a head temperature referred to atmosferic pressure of 350° C.

The fraction boiling at 175° – 350° C constitutes 5.3% by weight of the starting product, the residue boiling at 350° C+ being 94.7% by weight. The latter was then subjected to a catalytic hydrogenation, after having been diluted with a light solvent (n-heptane) by employing a catalyst based on Ni on Kieselguhr at the temperature of 180° C, at the hydrogen pressure of 100 kg/cm² and for a period of 2 hours.

The hydrogenated polymer obtained after stripping the solvent and having an initial boiling point of 350° C has a viscosity at 210° F of 840 cSt. Said polymer was used as additive for the mixture having the following formulation:

Formulation of 20 W-50 oil with a mineral base

| Composition | | weight % |
|---|---|---|
| Hydrogenated polymer, 840 cSt 210° F | | 11.0 |
| Addition package | | 6.7 |
| Pour point depressant additive | | 0.6 |
| Mineral base oil (cSt 210° F = 9.30: V.I., ASTM D 2270/A = 109 cP, 0° F = 6700) | | 81.7 |

| Characteristics | Method | weight % |
|---|---|---|
| Kinematic viscosity cSt 210° F | ASTM D 445 | 19.62 |
| Kinematic viscosity cSt 100° F | ASTM D 445 | 170.8 |
| Viscosity index | { ASTM D 2270/A | 125 |
| | ASTM D 2270/B | 141 |
| Viscosity 0° F, cP | ASTM D 2602 | 8400 |
| Pour point, ° C | ASTM D 97 | −31 |

EXAMPLE 2

A polymer with an initial boiling point of 175° C, having a viscosity at 210° F of 1160 cSt, prepared as above reported, was distilled up to 350° C, the residue of said distillation was then hydrogenated catalytically according to the procedure reported in example 1.

The fraction boiling at 175° – 350° C was 4.5% by weight, the residue boiling at 350° C + being the 95.5% b.w.; the latter, after hydrogenation, has a viscosity at 210° F of 1500 cSt. Said polymer was employed as additive for the mixture having the following formulation:

Formulation of 20 W-50 oil with a mineral base

| Composition | | weight % |
|---|---|---|
| Hydrogenated polymer, 1500 cSt 210° F | | 8.5 |
| Addition package | | 6.7 |
| Pour point depressant additive | | 0.6 |
| Base mineral oil (cSt 210° F = 9,30 I.V., ASTM 2270/A = 109 cP, 0° F = 6700) | | 84.2 |

| Characteristics | Method | weight % |
|---|---|---|
| Kinematic viscosity cSt 210° F | ASTM D 445 | 20.43 |
| Kinematic viscosity cSt 100° F | ASTM D 445 | 177.4 |
| Viscosity Index | { ASTM D 2270/A | 125 |
| | ASTM D 2270/B | 144 |
| Viscosity at 0° F, cP | ASTM D 2602 | 9200 |
| Pour point, ° C | ASTM D 97 | −30 |
| Flash point ° C | ASTM D 92 | 240 |

EXAMPLE 3

A polymer with initial boiling point of 175° C, having a viscosity at 210° F of 1450 cSt, prepared as above reported was distilled up to 350° C, the residue of said distillation being then catalytically hydrogenated according to the procedure reported in example 1.

The fraction boiling at 175° – 350° C was 4.2% by weight, the residue boiling at 350° C+ being 95.8% by weight. The latter, after hydrogenation had a viscosity at 210° F of 2160 cSt. Such polymer was employed as additive for the mixture having the following formulation:

Formulation of a 20 W-50 oil with a mineral base

| Composition | | weight % |
|---|---|---|
| Hydrogenated polymer, 2160 cSt 210° F | | 6.5 |
| Addition package | | 8.5 |
| Depressant pour point additive | | 0.6 |
| MIneral base oil (cSt 210° F = 8,71 I.V., ASTM D 2270/A = 110 cP, 0° F = 5800) | | 84.4 |

| Characteristics | Method | weight % |
|---|---|---|
| Kinematic viscosity cSt 210° F | ASTM D 445 | 18.38 |
| Kinematic viscosity cSt 100° F | ASTM D 445 | 154.9 |
| Viscosity Index | { ASTM D 2270/A | 125 |
| | ASTM D 2270/B | 143 |
| Viscosity at 0° F, cP | ASTM D 2602 | 8800 |
| Pour Point ° C | ASTM D 97 | −30 |

In the examples 1, 2 and 3 it will be noted that the viscosity index of the base oils (calculated according to ASTM D 2270/A method) was increased by the addition of the viscosity index improver additive of the invention from 109 – 110 to a value of 125.

EXAMPLE 4

A polymer with an initial boiling point of 175° C, having a viscosity at 210° F of 5330 cSt, prepared as reported above was distilled up to 350° C, the residue of said distillation was then catalytically hydrogenated according to the procedure reported in example 1.

The fraction boiling at 175° – 350° C was 3.6% by weight, the residue boiling at 350° C + being 96.4% by weight; the latter, after hydrogenation had a viscosity at 210° F of 6100 cSt. Such polymer was employed as additive for the mixture having the following formulation:

Formulation of 10 W-40 oil with a mineral base

| Composition | | weight % |
|---|---|---|
| Hydrogenated polymer, 6100 cSt 210° F | | 7.0 |
| Addition package | | 8.5 |
| Depressant pour point additive | | 0.6 |
| Base mineral oil (cSt 210° F = 5.05; I.V., ASTM 2270/A = 116; cP, 0° F = 1050) | | 83.9 |

| Characteristics | Method | |
|---|---|---|
| Kinematic viscosity 210° F, cSt | ASTM D 445 | 14.85 |
| Kinematic viscosity 100° F, cSt | ASTM D 445 | 95.4 |
| Viscosity Index | { ASTM D 2270/A | 139 |
| | ASTM D 2270/B | 174 |
| Viscosity at 0° F, cP | ASTM D 2602 | 2400 |
| Pour point, ° C | ASTM D 97 | −33 |

EXAMPLE 5

A polymer with an initial boiling point of 175° C, having a viscosity at 210° F of 8160 cSt, prepared as above reported, was distilled up to 350° C, the residue of said distillation was then catalytically hydrogenated according to the procedure reported in example 1.

The fraction boiling at 175° – 350° C was by 3.1% by weight, the residue boiling at 350° C + was 96.9% by weight; the latter after hydrogenation had a viscosity at 210° F of 9150 cSt. Such polymer was employed as additive for the mixture having the following formulation:

| Formulation of 10 W-40 oil with mineral base | | |
|---|---|---|
| Composition | | weight % |
| Hydrogenated polymer 9150 cSt 210° F | | 6.5 |
| Addition package | | 6.7 |
| Depressant pour point additive | | 0.6 |
| Base mineral oil (cSt 210° F = 5.05; I.V. ASTM 2270/A = 116; cP, 0° F – 1050) | | 86.2 |
| Characteristics | Method | |
| Kinematic viscosity 210° F, cSt | ASTM D 445 | 14.49 |
| Kinematic viscosity 100° F, cSt | ASTM D 445 | 91.8 |
| Viscosity Index | ASTM D 2270/A | 140 |
|  | ASTM D 2270/B | 175 |
| Viscosity 0° F, cP | ASTM D 2602 | 2200 |
| Pour point, ° C | ASTM D 97 | −33 |

EXAMPLE 6

A polymer with an initial boiling point of 175° C, having a viscosity at 210° F of 14,900 cSt prepared as above reported, was distilled up to 350° C, the residue of said distillation was then catalytically hydrogenated according to the procedure reported in example 1.

The fraction boiling at 175° – 350° C was 2.8% by weight, the residue boiling at 350° C + was 97.2% by weight; the latter after hydrogenation had a viscosity at 210° F of 16,300 cSt. Said polymer was used as additive for the mixture having the following formulation:

| Formulation of the 10 W-40 oil with mineral base | | |
|---|---|---|
| Composition | | weight % |
| Hydrogenated polymer, 16,300 cSt 210° F | | 2.5 |
| Addition package | | 6.7 |
| Pour point depressant additive | | 0.6 |
| Base mineral oil (cSt 210° F = 5.05 I.V., ASTM D 2270/A = 116 cP, 0° F = 1050) | | 90.2 |
| Characteristics | Method | |
| Kinematic viscosity 210° F, cSt | ASTM D 445 | 14.93 |
| Kinematic viscosity 100° F, cSt | ASTM D 445 | 94.6 |
| Viscosity Index | ASTM D 2270/A | 140 |
|  | ASTM D 2270/B | 176 |
| Viscosity 0° F, cP | ASTM D 2602 | 2350 |
| Pout point, ° C | ASTM | −30 |

From examples 4, 5 and 6 it will be noted that the viscosity index of the base oil (calculated according to the ASTM method D 2270/A) was increased by the addition of the Viscosity Index Improver of the invention, from 116 to the value of 139 – 140.

EXAMPLE 7

The hydrogenated polymer boiling at a temperature higher than 350° C (350° C +) used in this example as "Viscosity Index Improver" was the same as the one reported in example 3 and which presents a viscosity at 210° F of 2160 cSt. Said polymer was employed as additive for the mixture having the following formulation:

| 10 W-50 oil formulation having an synthetic base | | |
|---|---|---|
| Composition | | weight % |
| Hydrogenated polymer 2160 cSt at 210° F | | 15.0 |
| Addition package | | 8.5 |
| Synthetic oil (cSt 210° F = 4.50 V.I., ASTM D 2270/A = 125 cP, 0° F = < 200 | | 76.5 |
| Characteristics | Method | |
| Kinematic viscosity at 210° F | ASTM D 445 | 18.30 |
| Kinematic viscosity at 100° F | ASTM D 445 | 107.3 |
| Viscosity Index | ASTM D 2270/A | 144 |
|  | ASTM D 2270/B | 201 |
| Viscosity at 0° F, cP | ASTM D 2602 | 1650 |
| Pour point, ° C | ASTM D 97 | −35 |

EXAMPLE 8

The hydrogenated polymer boiling at 350° C + used in this example as Viscosity Index Improver was the same as the one reported in example 3 and had a viscosity at 210° F of 2160 cSt. Said polymer was employed as additive for the mixture having the following formulation:

| 5 W-30 oil formulation having a synthetic base | | |
|---|---|---|
| Composition | | weight % |
| Hydrogenated polymer, 2160 cSt at 210° F | | 10.0 |
| Addition package | | 8.5 |
| Synthetic oil (cSt 210° F = 4.50 V.I., ASTM D 2270/A = cP, 0° F < 200) | | 81.5 |
| Characteristics | Method | weight % |
| Kinematic viscosity cST at 210° F ASTM D 445 | | 12.05 |
| Kinematic viscosity cSt at 100° F | ASTM D 445 | 67.02 |
| Viscosity Index | ASTM D 2270/A | 147 |
|  | ASTM D 2270/B | 190 |
| Viscosity 0° F, cP | ASTM D 2602 | 1050 |
| Pour point, ° C | ASTM D 97 | −40 |

In examples 7 and 8 it will be noted that the viscosity index of the base synthetic oil calculated according to the ASTM D method D 2270/A) is increased, with addition of the additive "Viscosity Index Improver" of invention, from 125 to the values respectively of 144 and 147.

EXAMPLES 9 and 10

These examples concerned the tests of shear stability which were carried out on the oils respectively of the examples 2 and 5. For the tests the solic oscillator of the Rayton type, ASTM D 2603 – 70 was employed, for a period of 15 minutes, by determining the change of the viscosity, measured at the two temperatures of 210° F and 100° F.

As to the example 9 a shear stability test on the 20 W - 50 oil of example 2 was carried out.

The results were the following:

|  | Initial | After test | Loss of viscosity |
|---|---|---|---|
| Kinematic viscosity: | | | |
| a 210° F, cSt | 20.43 | 18.46 | 9.6 % |
| a 100° F, cSt | 177.4 | 159.5 | 10.1 % |

As to the example 10 a shear stability test on the 10 W - 40 oil of example 5 was carried out and the results were the follows:

|  | Initial | After test | Viscosity loss |
|---|---|---|---|
| kinematic viscosity at 210° F, cSt | 14.49 | 13.14 | 9.3 % |
| Kinematic viscosity at 100° F, cSt | 91.8 | 83.1 | 9.5 % |

When it is noted that the two oils of examples 2 and 5 were formulated by employing two hydrogenated polymers having very different viscosities, namely 1500 and 9150 cSt at 210° F, respectively, it will be observed that the depolymerization rate is independent of the viscosity of the polymer used.

EXAMPLES 11 and 12

These examples compare the rates of depolymerization (shear stability) of the lubricants containing commercial V.I.I. additives with that of lubricating oils containing the V.I.I. additives of the present invention.

Example 11 employed an oil of SAE 20 W - 50 grade with a commercial V.I.I. additive based on polymethacrylate.

| 20 W-50 oil of the example 11 | | |
|---|---|---|
| Composition | | weight % |
| Commercial polymer | | 7.0 |
| Additives package | | 6.7 |
| Base mineral oil (cSt 210° F = 9.68: V.I. = = 105: cP, 0° F = 7100 | | 86.3 |
| Characteristics | Method | |
| Kinematic viscosity 210° F, cSt | ASTM D 445 | 19.37 |
| Kinematic viscosity 100° F, cSt | ASTM D 445 | 161.4 |
| Viscosity index | ASTM D 2270/A | 127 |
|  | ASTM D 2270/B | 147 |
| Viscosity at 0° F, cP | ASTM D 2602 | 8600 |
| Pour point, °C | ASTM D 97 | −28 |
| Shear stabiity test | ASTM D 2603 | −70 |

|  | Initial | After test | Loss of viscosity |
|---|---|---|---|
| Kinematic viscosity 210° F, cSt | 19.37 | 16.12 | 16.8 % |
| Kinematic viscosity 100° F, cSt | 161.4 | 136.0 | 15.7 % |

Example 12 employed an oil of SAE 10 W - 40 grade prepared with a V.I.I. additive based on polymethacrylate.

| 10 W-40 oil of the example 12 | | |
|---|---|---|
| Composition | | weight % |
| Commercial polymer | | 10.5 |
| Addition package | | 6.7 |
| Base mineral oil (cSt 210° F = 5.6: V.I. = = 117: cP, 0° F = 1350) | | 82.8 |
| Characteristics | Method | |
| Kinematic viscosity 210° F, cSt | ASTM D 445 | 16.44 |
| Kinematic viscosity 100° F, cSt | ASTM D 445 | 102.3 |
| Viscosity index | ASTM D 2270/A | 141 |
|  | ASTM D 2270/B | 185 |
| Viscosity at 0° F, cP | ASTM D 2602 | 2400 |
| Pour point, °C | ASTM D 97 | −28 |

Shear stability test (ASTM D 2203 - 70)

|  | Initial | After test | Viscosity loss |
|---|---|---|---|
| Kinematic viscosity 210° F, cSt | 16.44 | 13.61 | 17.2 % |
| kinematic viscosity 100° F, cSt | 102.3 | 84.36 | 16.5 % |

By comparison of the shear stability tests of examples 11 and 12 with those of examples 9 and 10 it will be observed that the oils containing the viscosity index improver additives of the present invention present a depolymerization rate which is about one half that of the oils containing commercial viscosity index improver additives.

What we claim is:

1. Process for the preparation of an additive for mineral or synthetic lubricating oils, capable of improving the viscosity index of said oils, wherein polymeric material of very high viscosity, boiling above 175° C, which is obtained through polymerization of normal alpha-olefines having the general formula R—CH = CH$_2$ wherein R is an alkyl radical containing from 2 to 16 carbon atoms, in the presence of the catalyst TiCl$_4$./polyiminoalane in a substantially inert atmosphere containing not more than the quantity of hydrogen which has a manometer pressure of 1 kg/cm$^2$ and by then recovering by distillation the fraction of the polymerization product boiling above 175° C, is subjected to a distillation at reduced pressure to a temperature which corresponds to a distillation temperature of 350° C at atmospheric pressure, and then subjecting the obtained product with an initial boiling point of 350° C to catalytic hydrogenation.

2. Additive for improving the viscosity index of lubricating oil when obtained by the process of claim 1.

3. Additive for improving the viscosity index of lubricating oil consisting essentially of a mixture of polymers produced by the process of claim 1.

* * * * *

UNITED STATES PATENT AND TRADEMARK OFFICE
CERTIFICATE OF CORRECTION

PATENT NO. : 3,985,821
DATED : October 12, 1976
INVENTOR(S) : Pier Leone Girotti, et al It is certified that error appears in the above-identified patent and that said Letters Patent are hereby corrected as shown below:

Col. 2, line 45, correct "improvers" to read -- improver --, and change "in" to -- to --;

line 47, correct "comparison" to read -- comparative -- and change "between" to -- showing --;

line 48, correct "invention" to read -- inventive --;

line 50, after "constituted" delete the "," (comma)

and insert -- of --;

line 51, delete "besides that by";

line 52, delete "by";

line 53, delete "by" (both occurrences).

Col. 5, line 1, after "was" delete "by";

line 41, correct "16,300" to read -- 16.300 --.

UNITED STATES PATENT AND TRADEMARK OFFICE
CERTIFICATE OF CORRECTION

PATENT NO. : 3,985,821

DATED : October 12, 1976

INVENTOR(S) : Pier Leone Girotti, et al

It is certified that error appears in the above-identified patent and that said Letters Patent are hereby corrected as shown below:

Col. 6, line 36, after "210°F", delete "ASTM D 445 12.05" and under column entitled "Method" insert -- ASTM D 445 --, and under column entitled "weight %" insert -- 12.05 --;

line 53, correct "solic" to read -- sonic --.

Signed and Sealed this

Seventh Day of June 1977

[SEAL]

Attest:

RUTH C. MASON
Attesting Officer

C. MARSHALL DANN
Commissioner of Patents and Trademarks